United States Patent [19]
Ferguson

[11] Patent Number: 4,722,649
[45] Date of Patent: Feb. 2, 1988

[54] RELEASABLE FASTENING DEVICE

[75] Inventor: Stuart R. Ferguson, Beverly Hills, Calif.

[73] Assignee: Northrop Corporation, Hawthorne, Calif.

[21] Appl. No.: 705,839

[22] Filed: Feb. 26, 1985

[51] Int. Cl.[4] ............................................. F16B 21/00
[52] U.S. Cl. .................... 411/341; 411/347; 24/453; 24/614
[58] Field of Search ...................... 411/347, 16, 18, 55, 411/343, 342, 348, 385, 249, 549, 551, 34, 35, 36, 37, 38, 39, 350, 353, 352, 999, 508, 337, 17, 355, 341; 24/453, 614, 615

[56] References Cited

U.S. PATENT DOCUMENTS

| 1,426,239 | 8/1922 | Witzberger | 411/385 |
| 1,643,586 | 9/1927 | Ratigan | 411/347 |
| 2,571,641 | 10/1951 | Wing | 411/349 X |
| 2,643,573 | 6/1953 | Johnson | 411/337 |
| 2,696,138 | 12/1954 | Olschwang | 411/341 |
| 3,008,552 | 11/1961 | Cushman et al. | 411/531 X |
| 3,390,712 | 7/1968 | McKay | 24/453 X |
| 3,412,774 | 11/1968 | Schuster | 411/353 |
| 3,503,431 | 3/1970 | Villo et al. | 411/353 |
| 3,535,750 | 10/1970 | Metz | 411/555 |
| 3,812,756 | 5/1974 | Wenger | 411/999 X |
| 4,371,301 | 2/1983 | Lawson | 411/353 |

FOREIGN PATENT DOCUMENTS

| 741502 | 8/1966 | Canada | 411/55 |
| 2452398 | 5/1976 | Fed. Rep. of Germany | 411/548 |
| 573227 | 11/1945 | United Kingdom | 411/349 |

Primary Examiner—Gary L. Smith
Assistant Examiner—Rodney M. Lindsey
Attorney, Agent, or Firm—Terry J. Anderson; Robert B. Block

[57] ABSTRACT

A releasable fastening device for securing workpieces together in a firm and intimate relationship is disclosed. The fastening device is sometimes referred to as a "blind fastener". The fastener comprises a bolt member including a head located on one end of the bolt and extending outwardly therefrom to support an upper workpiece and a shank with an annular recess, the shank being insertable within said through axially aligned apertures located in the workpieces. An expandable device, preferably in the form of a stiff spring is inserted and is confined within the annular recess. When the spring is in its expanded position, it extends beyond the shank along a bottom surface of a lower workpiece thereby along with the head on the bolt member holding the workpieces together in a mating relationship. A mechanism is included which releasably engages the spring and is capable of limiting the springs extension to within the annular recess to thereby allow the fastener to be inserted and withdrawn through the align apertures in the workpieces.

14 Claims, 5 Drawing Figures

RELEASABLE FASTENING DEVICE

BACKGROUND OF THE INVENTION

I. Field of the Invention

This invention relates generally to a releasable fastening device used for holding several workpieces together, and more specifically, to an improved releasable fastener sometimes referred to as a "blind fastener" that is capable of holding several workpieces together in a firm and intimate relationship and that can also compensate for a tolerance buildup between the workpieces.

II. Description of the Prior Art

The releasable fastener described herein is sometimes referred to as a "blind fastener". This type of fastener is primarily intended to be used with a workpiece or support member, such as a wall or any other type of sheet material, in mounting one or more items to the workpiece through the use of an elongated member, such as a bolt or screw. Thus, for example, a blind fastener can be used in mounting a picture upon a wall or in securing two or more workpieces or support members together. These fasteners are often employed in situations involving the mounting of fixtures or structural elements on support members, such as walls, in those situations in which it is very difficult or impossible to secure the fastener to the rear or blind side of the support member.

While many different kinds of these fasteners are used commercially, they do have many disadvantages. For example, many such devices typically must be formed of certain light gage materials which will allow the device to undergo a certain amount of deformation when used. Many require the use of a great deal of force to install the device. In addition many of these devices are limited in use in that they can only be employed with workpieces having a particular thickness.

Certain of the prior art blind nut or anchor bolt assemblies are multi-piece devices which are very complex in structure and very expensive due to the relatively high manufacturing costs of the device. Furthermore, these prior art type of anchor bolt devices generally require one to make excessively large holes in the workpieces which are to be assembled together. They have the additional disadvantage that the screws used with the fastening device cannot be removed after installation without the toggle portion being disengaged from the rear surface and generally lost. In such cases, the device must be replaced.

When one is examining the various blind fasteners that are described in the prior art and is making an attempt to improve on such devices, it is important to consider that such an improved fastener should be made comparatively inexpensive in order to be commercially acceptable. However, it is also necessary that any such fastener be relatively simple to use. In addition, while considering these factors, it is also very important that the fastener be constructed so as to provide a strong holding force to secure workpieces together in a firm and intimate manner.

Examples of some other types of fasteners related to the type of releasable fastener described by the present invention can be found in U.S. Pat. Nos. 1,179,9597, 1,755,590, 2,132,284, 2,826,231, 2,948,317, 3,091,030, 3,126,835, U.S.S.R. Pat. No. 868,149 and Belgium Pat. No. 508,342.

SUMMARY OF THE INVENTION

It is therefore an object of the present invention to provide a releasable fastener substantially devoid of all of the above-noted disadvantages.

Another object of the present invention is to provide a releasable fastener, sometimes referred to as a "blind fastener", that can be used to secure workpieces together in a simple manner and at the same time provide a substantially strong, firm and intimate mating relationship between the workpieces.

Still another object of the present invention is to provide a releasable fastener that is relatively simple to manufacture and relatively inexpensive when compared to some of the more complex prior art devices.

Still another object of the present invention is to provide a releasable fastener that does not have to be deformed to achieve its function of fastening workpiece together.

A further object of the present invention is to provide a releasable fastener that can include an adjustment means (i) to compensate for tolerance buildup between those workpieces being secured together and (ii) further increase the firm and intimate mating relationship between the workpieces.

The foregoing objects and others are accomplished in accordance with the present invention by providing a releasable fastener that comprises a bolt member including a head and a shank, the head being located on one end of the bolt member and extending outwardly therefrom to support an upper workpiece, whereas the shank with an annular recess therein is insertable within and through axially aligned openings located in the workpieces.

The fastener includes an expandable means; e.g., a spring, adapted to be inserted and confined within the annular recess. When the bolt member is inserted within the openings in the workpieces and the expandable means is in an expanded position (relaxed position), this means extends beyond the shank along a bottom surface of a lower workpiece thereby (along with the head of the bolt) holding the workpieces together in a mating relationship. A retainer means is used with the fastener device and is adapted to releasably engage the expandable means to limit its expansion within the confines of the annular recess on the shank when in an engaged position thereby allowing the fastener to be inserted and withdrawn through the apertures in the workpieces.

In another embodiment of the present invention the releasable fastener as described herein can include an adjustable means that would be able to compensate for any tolerance buildup between the workpieces being secured together. This mechanism would also be able to further increase the firm and intimate mating relationship between the workpieces beyond that which can be achieved with the fastening device without this adjustment mechanism.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

The present invention concerns the art of securing workpieces together and relates to a releasable fastening device sometimes referred to as a "blind fastener". The fastening device comprises three primary elements; i.e., a bolt member, an expandable means and a retainer means, all of which function together as a fastening device to releasably secure workpieces together in the specific manner as described hereinbelow.

Figure 1:
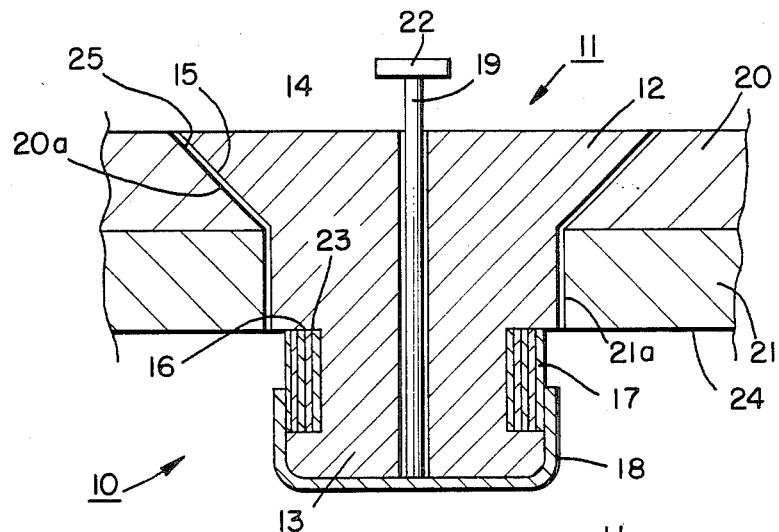
FIG. 1 is a front plan sectional view of a releasable fastening device in accordance with the present invention illustrating the retainer mechanism in a latched position thereby allowing the device to be removed from the workpieces.
Figure 2:
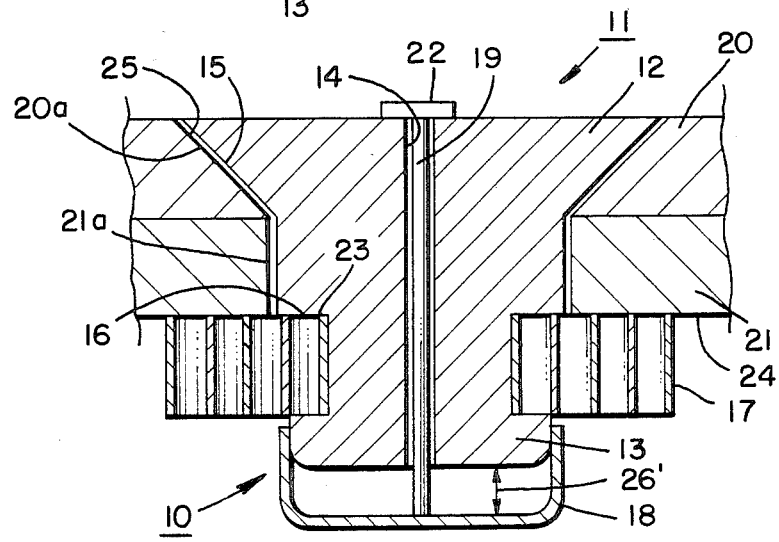
FIG. 2 is a front plan sectional view of a releasable fastening device in accordance with the present invention illustrating the retainer mechanism unlatched position thereby allowing the device to hold the workpieces together.

An embodiment of a releasable fastening device that employs the features in accordance with the present invention is shown in FIGS. 1 and 2 as fastening device 10. Broadly speaking, the fastening device includes a bolt member 11 that consists of a head portion 12, a shank 13 and a longitudinal opening 14 extending along the entire length of the bolt member.

As shown, the head portion 12 is positioned on one end of the bolt member and extends outwardly from the bolt. The head preferably includes a tapered portion 15 located on its underside. The shank 13 extends from the head portion and includes an annular recess 16 thereon. An expandable means, preferably in the form of a spiral spring 17, is of such dimensions that it is able to be inserted and confined within recess 16 as shown in FIG. 1.

Figure 3:
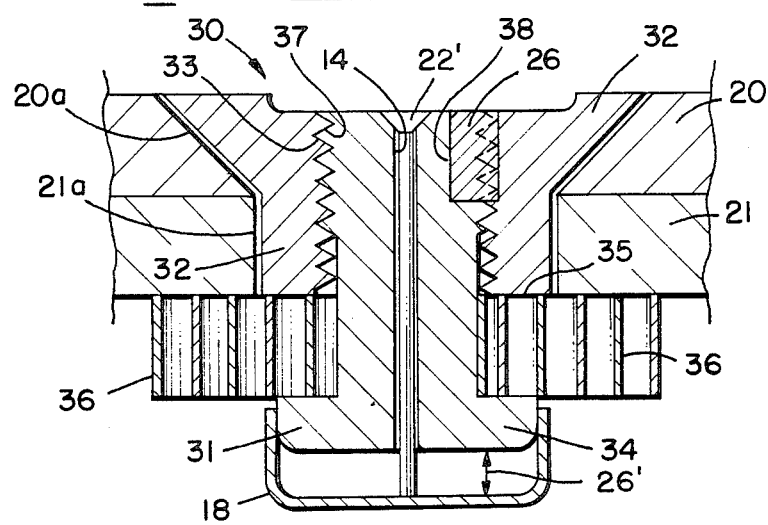
FIG. 3 is a front plan sectional view of a second embodiment of a releasable fastening device including an adjustment means in accordance with the present invention.

As clearly illustrated in the figures the spring 17 is formed of a ribbon of flat resilient material wrapped about the shank 13 at the recess 16 to form an expansible spiral shape. In this shape one end of the ribbon will begin at the center of spring 17 and the other end of the ribbon will terminate at the periphery of the spiral shape with the upper and lower edges of the spring 17 forming planes generally perpendicular to the longitudinal axis of the shank 13. As shown in FIGS. 2 and 3 this spiral ribbon structure in cross section includes a plurality of ribbon portions individually having cross-sectional widths oriented generally parallel to the longitudinal axis of the shank 13. For the purposes of this application a spring of this sort shall be referred to as a spiral ribbon spring. As can be seen in FIGS. 2 and 3 the upper edge of the spiral ribbon spring, when the spring is expanded, engages a considerable region on the underside 24 of sheet 21 well away from the aperture 21a through which the shank 13 projects. Since the edge of the spring 17 engages the sheet 21 there is less likelihood of the spring 17 shearing. Similarly, the extensive area of the sheet 21 engaging the spring edge also makes it less likely that the sheet 21 will shear.

The fastening device 10 also includes a retainer means that is employed to releasably engage spring 17 in a manner which limits its expansion to a tightly wound position within the confines of the recess when the retainer means engages spring 17. The retainer means preferably is provided with a cup member 18 and a pin member 19 that is secured thereto, such as by rivetting, and extends from the cup member.

A typical usage for releasable fastening device 10 is to secure workpieces together, such as sheets 20 and 21. To accomplish this result, bolt member 11 is first inserted through the axially aligned openings 20a and 21a in sheets 20 and 21, respectively. This insertion step is accomplished while the cup member 18 holds spring 17 is a wound tight and confined position within recess 16 as shown in FIG. 1. Of course, the insertion is able to be achieved by sizing the various components of fastening device 10 in a manner which permits the outside dimensions of cup member 18 to be at least slightly smaller than the inside diameter of the openings 20a and 21a in the workpieces. By so doing, the cup can be easily inserted through the openings when the cup member retains spring 17 in a wound tight position.

Recess 16 is positioned on shank 13 so that when the fastening device has been inserted within the openings 20a and 21a of sheets 20 and 21, respectively, (as shown in FIGS. 1 and 2), the plate of the top portion 23 of recess 16 lies substantially contiguous to the plane of the bottom portion 24 of sheet 21. This permits spring 17, when in an unwound position, as shown in FIG. 2, to lie along the bottom portion 24 of sheet 21 thereby, together with the effect of head 12, holding the sheets 20 and 21 together. As shown in the drawings, top sheet 20 includes a tapered surface 25 within the opening therein which cooperates with the taper located on the bottom portion of head 12 thereby allowing the top of the head to lie substantially flush with the top surface of sheet 20 when bolt member 11 is completely inserted within the sheet openings.

In operation, when a user of the fastening device in accordance with the present invention desires to secure sheet members 20 and 21 together in a firm and intimate relationship, the sheet members are first positioned together with the workpiece openings 20a and 21a positioned in substantial axial alignment. Spring 17 is wound tightly within the confines of recess 16. The retainer means is positioned on the bolt member by the insertion of pin 19 through the bottom of longitudinal opening 14 within the bolt member and then moving cup member 18 via pin 19 so that the cup supports the spring in a confined and wound tight position.

The fastening device is then inserted via the shank within the aligned openings and positioned in the manner as shown in FIG. 1. Thereafter the user, who is able to manipulate the retainer means by moving pin 19 in the directions of arrow 26' (FIGS. 2 and 3), moves the pin in a downward direction until spring 17 is released from cup 18 and is allowed to expand along the bottom portion of sheet 21 to its expanded position as shown in FIG. 2. When the retainer means is in this unlatched position, the fastening device, via spring 17 and head 12, holds sheets 20 and 21 tightly together in a firm and intimate mating relationship.

As an aid to the user, pin member 19 may have a cap member 22 installed therein to provide a more convenient surface to push on when moving the pin downward to release the spring from the cup. Any suitable means can be used for this purpose. For instance, as shown in FIG. 1, cap 22 can be installed on pin member 19 after the pin member and cup are installed on the bolt member 11. This can be accomplished by any suitable means such as by providing a threaded surface on the upper end of pin member 19 and a matching threaded surface in cap 22 so that the cap can be screwed onto the pin member before use of the fastening device. Such arrangement also prevents the pin member from inadvertently falling out of the bolt member when the cup member 18 is disengaged from spring 17, especially when the bolt member is in a vertical position and the cap member is underneath the workpiece.

At times there could occur a certain amount of tolerance build-up in the sheets 20 and 21 that would tend to loosen their firm and intimate mating relationship. To compensate for this extra tolerance, and to also increase the gripping force to the sheets, another embodiment of the present invention is shown in FIG. 3. This embodiment comprises the same three elements discussed above; i.e., a bolt member, expandable means and retainer means, all of which function and are used in the same manner as described above, and further includes an adjustment means. This adjustment means compensates for substantially any tolerance buildup between sheets 20 and 21, and further increases the firm and intimate mating relationship between these sheets.

As shown in FIG. 3, the adjustment means preferably includes a bolt member which has a head portion 30 and a shank 31. However, unlike the particular embodiment of the present invention described above with regard to the bolt member shown in FIG. 1 and FIG. 2, the bolt member in FIG. 3 is formed of two separate elements. A first element 32 includes a hollow head portion and an internally threaded surface 33. A second element 34 includes a lower portion which forms the lower part of shank 31 having an annular recess 35 for securing and confining spring 36 therein.

The second element of the bolt member also includes an externally threaded portion 37 which engages with threaded surface 33 and thereby, upon tightening of the first element, causes the second element to be pulled toward sheets 20 and 21. This action between the two elements 32 and 34 removes substantially all of the tolerance build-up in the sheets and also increases the gripping force between the fastener and the sheets.

It is preferable, when using an adjustment means as shown in FIG. 3, to provide means to assure that the threaded surface 37 of shank 31 and the threaded surface 33 of head 30 remain in position relative to one another after adjustment has been made for any tolerance build up between the sheets. Any suitable means can be used such as a locking material which is inserted into either the shank 31 or head 30.

Figure 4A:
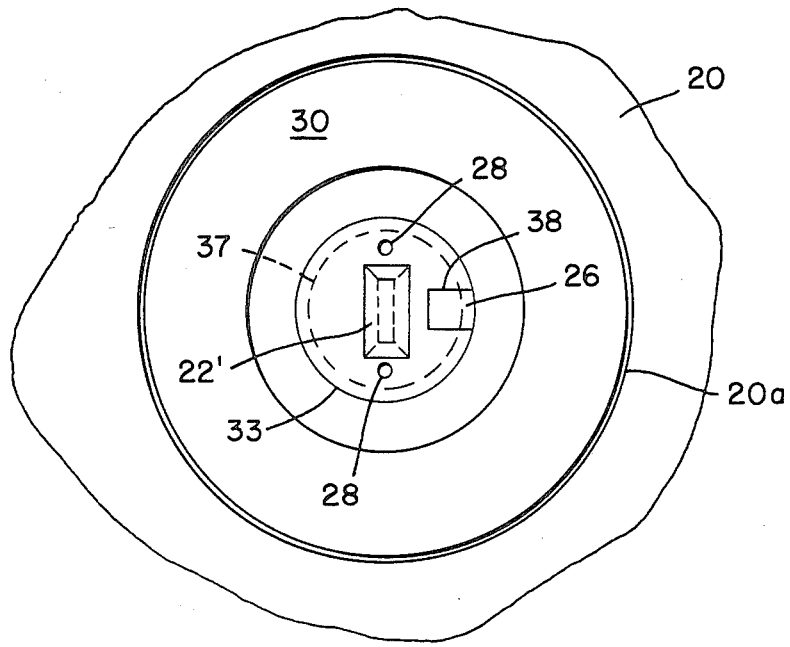
FIG. 4a is a top plan view of the shank and head of the fastener device showing the locking device, cap and tool holes for making adjustments.
Figure 4B:
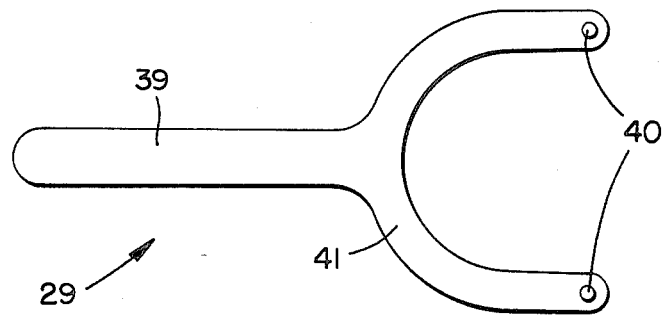
FIG. 4b is a top plan view of a turning tool.

For instance, as shown in FIG. 4a, the portion of shank 31 that contains externally threaded portion 37 has a locking member keyway 38 which is adapted to hold locking member 26. Locking member 26 may also contain threads on its surface facing threads 33 of the head 30 so that it engages therewith as though it were part of threads 37 on shank 31. Locking member 26 can be sized to snugly fit in keyway 26 and be made of any suitable material, such as a resilient, durable plastic material. A suitable material is NYLOCK, a trademark of B. F. Goodrich Co., Akron, Oh.

Locking member 26 should be sized so that as it turns with shank 31, it engages head 30 with an interference fit. In this manner, if adjustment is to be made between the shank and head, turning force can be applied to the shank 31 to move it and locking member 26 relative to the head 31. However, without such turning force, locking member, due to its interference fit with head 30, prevents shank 31 from turning relative to head 30. The interference force between locking member 26 and head 30 however should not be so great as to also turn the head in the workpiece. The head is intended to be held stationary relative to the workpiece by friction or any other suitable means or device as shank 31 is turned relative to it.

In the embodiment of the fastening device shown in FIG. 3, provision has also been made for a cap means on pin member 19, cap 22'. However, cap 22' can be shaped differently than the one shown in FIGS. 1 and 2 to accommodate a turning tool for the adjustment means. The threaded portion of shank 31 has a cap recess 27 into which cap 22' fits when cup 18 releases spring 17. This enables a turning tool to be placed on 15 shank 31 for turning the shank relative to head 30.

Any suitable type of turning tool can be used such as the spanner-type tool 29 shown in FIG. 4A. The tool includes a handle 39 joined to yoke 41, the yoke 41 containing spaced apart posts 40. Posts 40 are engageable with post holes 28 (See FIGS. 3 and 4A) when shank 31 is to be adjusted relative to head 30.

The user installs the fastening device by slipping the cap and spring through aligned holes 20a and 21a and then pushing on cap 22' to release the cup from the spring. As the cup is released from the spring, cap 22' locates itself in cap recess 27 thereby providing clearance for tool 29. The user can then insert posts 40 of the tool into post holes 28 on shank 31 and apply force to the tool handle 39 to turn shank 31 relative to the head 30. Any other suitable means can be used to make such an adjustment. For example, the end of shank 31 having the threads or the cap 22' could be made with screwdriver slots or notches and a simple screwdriver or other tool used to make adjustments between shank 31 and head 30. It is also understood that provisions can also be made, if necessary, to hold head 30 stationary in the workpiece while the shank is adjusted relative to it. Any suitable tool for use with the turning tool can be used for this purpose such as a second spanner-type tool.

As described above, it is basically the expandable means in combination with the head portion of the bolt member, preferably in the form of a spring 17 or 36, which retains the releasable fastener in place with the workpieces. The blind fastener concept in accordance with the present invention is based on a confined spiral spring (FIG. 1) which is allowed to expand on installation (FIGS. 2 or 3). The expanded spiral spring retains the fastener in place. In view of the functional requirements of the spiral spring, it is preferably formed of a thick gauge metal, such as steel, making it very stiff after expansion. To obtain its required properties, the spring is preferably heat treated in the open or expanded configuration and thereafter wound down and confined in the annular recess of the device.

While this invention has been described in conjunction with specific embodiments thereof, it is evident that many alternatives, modifications and variations will be apparent to those skilled in the art. Accordingly, the present invention is intended to embrace all such alternatives, modifications and variations, and fall within the spirit and scope of the appended claims.

I claim:

1. A releasable fastener for securing together first and second workpieces having aligned apertures comprising:

a bolt member including a shank extending through said apertures and a head located on one end to extend laterally outwardly therefrom to engage one of said workpieces, said shank having an annular recess thereon and dimensioned to be inserted through the aligned apertures;

a spiral spring comprising a coiled ribbon of resilient metal formed into an expansible spiral with a first inner portion at the middle supported by the shank, and a second portion at the outer periphery of said spring, said spring having a relaxed shape including plural overlapping turns surrounding the shaft of the bolt and lying in a plane perpendicular to said shaft, and so constructed that, when relaxed, the expanded spiral overlies an entire annular region of one of said workpieces surrounding the aperture therein to distribute the fastening load from the bolt to said entire region, said spiral ribbon spring disposed partially within and supported in said annular recess of said shank and extending circumferentially around said shank a sufficient number of turns so that when relaxed and expanded, a complete turn of said coil extends beyond said shank with an edge of said spiral spring engaging the entire circumference of the surface of the other of said workpieces about said aperture and said bolt to thereby hold, and, along with said head, secure said workpieces together; and retainer means adapted to releasably engage said spring to confine the same within said annular recess so as to allow said fastener to be inserted through said aligned apertures.

2. A releasable fastener according to claim 1 wherein said bolt member includes a longitudinal opening therein to slidably receive said retainer means.

3. A releasable fastener according to claim 2 wherein said retainer means includes a cup member adapted to capture and hold said spiral ribbon spring and engage it in a compressed position, and a pin member extending from the cup member and adapted to be slidably inserted within said longitudinal opening to enable a user to manipulate said retainer means.

4. A releasable fastener according to claims 1, 2 or 3 further comprising an adjustment means to compensate for tolerance buildup between said workpieces after being secured together and to further increase the tight mating relationship between said workpieces.

5. A releasable fastener according to claim 4 wherein said fastener comprises a bolt member formed of two elements including a first element defining said feed and having an internally threaded surface and a second element including a lower portion of said shank with said annular recess and an external threaded portion along the free end of said shank adapted to extend into said hollow head portion and to engage said internal threads.

6. A releasable fastener according to claims 1, or 3, wherein said head includes a taper located on its underside portion which cooperates with a tapered aperture located within said first workpiece.

7. A releasable fastener according to claim 3 wherein the pin member has a cap means for retaining the pin in said bolt.

8. A releasable fastener according to claim 1 wherein said spiral spring is formed of a thick guage heat treated metal.

9. A releasable fastener according to claim 5 wherein one of said two elements has a locking means for locking said one element to the other of said two elements.

10. A releasable fastener as in claim 1 further including:

adjustment means to compensate for tolerance buildup between said workpieces after being secured together and to further increase a tight mating relationship between said workpieces.

11. A fastener as in claim 10 further in which said retainer means comprises:

a retaining cup positioned adjacent a second end of the bolt member shaft portion and having a diameter slightly greater than the second end of the shaft portion and a wall longer than the distance from the end of the shaft portion second end to a proximate edge of the annular recess, wherein the cup wall restrains the spiral spring within the shaft portion annular recess when the cup is disposed over said second end of the shaft portion.

12. The fastener device of claim 11 further comprising a pin, attached at a first end to the retaining cup, extending through the bore and a retention cap, attached to a second end of the pin, having a diameter greater than the bolt member bore.

13. The fastener device of claim 11 wherein the bolt member head portion has an internally threaded longitudinal bore and the bolt member shaft portion first end is externally complimentarily threaded and extends into the head portion, wherein the head portion and the shaft portion of the bolt member can further tighten the mating relationship between the workpieces to compensate for tolerance buildup to thus define said adjustment means.

14. A releasable fastener device for securing together a first and a second workpiece both having axially aligned apertures, comprising:

a bolt member including a head portion having a tapered surface cooperating with a tapered aperture located within said first workpiece, said head portion further defining a hollow cavity opening into an apex of said tapered surface and having an internally threaded surface within said cavity, said bolt member also including a shank portion having a first end with an externally threaded portion adapted to extend into said head portion cavity and engage said head portion internal threads, said shank portion further defining an annular recess proximate a second end of said shank portion and extending beyond said first and second workpieces when the fastener is inserted through the axially aligned apertures of said shank portion form an adjustment means compensating for tolerance buildup between said workpieces after being secured together and for further increasing a tight mating relationship between said workpieces, said bolt member further defining a bore oriented along a longitudinal axis of said bolt member extending through both said head portion and said shank portion;

a spiral spring comprising a coiled ribbon of resilient metal formed into an expansible spiral with a first inner portion at the middle supported by the shank, and a second portion at the outer periphery of said spring, said spring having a relaxed shape including plural overlapping turns surrounding the shaft of the bolt member and lying in a plane perpendicular to said shaft, and so constructed that, when relaxed, the expanded spiral overlies an entire annular region of one of said workpieces surrounding the aperture therein to distribute the fastening load from the bolt member to said entire region, said spiral ribbon spring disposed partially within and supported in said annular recess of said shank and extending circumferentially around said shank a sufficient number of turns so that when relaxed and expanded, a complete turn of said coil extends beyond said shank with an edge of said spiral spring engaging the entire circumference of the surface of the other of said workpieces about aperture and said bolt to thereby hold, and, along with said head, secure said workpieces together; and a retaining cup adjacent a second end of the bolt member shank portion, said retaining cup having a diameter slightly greater than the second end of the shank portion and further having a wall portion longer than the distance from the end of the shank portion second end to the proximate edge of the annular recess, wherein the cup wall restrains the spiral ribbon spring within the shank annular recess when the retaining cup engages the shank portion second end; and a release pin disposed within and extending through the longitudinally axially oriented bolt member bore and attached at a first end to said retaining cup, wherein depressing a second end of the release pin extending from said bolt member head portion displaces the retaining cup and releases the spiral ribbon spring.

* * * * *